(12) United States Patent
Pater et al.

(10) Patent No.: US 8,747,938 B2
(45) Date of Patent: Jun. 10, 2014

(54) PET CHEW AND MANUFACTURING PROCESS

(75) Inventors: Willem Theodoor Martinus Pater, Winschoten (NL); Maarten Willem-Peter de Weerd, Odoorn (NL); Janjaap Freije, Zuidlaarderveen (NL); Geraldus Gerardus Johannes Schennink, Wehl (NL)

(73) Assignee: Paragon Products B.V., Veendam (NL)

( * ) Notice: Subject to any disclaimer, the term of this patent is extended or adjusted under 35 U.S.C. 154(b) by 424 days.

(21) Appl. No.: 12/993,647

(22) PCT Filed: May 20, 2009

(86) PCT No.: PCT/NL2009/050276
§ 371 (c)(1),
(2), (4) Date: Dec. 10, 2010

(87) PCT Pub. No.: WO2009/142493
PCT Pub. Date: Nov. 26, 2009

(65) Prior Publication Data
US 2011/0076366 A1 Mar. 31, 2011

(30) Foreign Application Priority Data
May 20, 2008 (EP) .................................. 08156556

(51) Int. Cl.
*A23K 1/18* (2006.01)
(52) U.S. Cl.
USPC ........... 426/635; 426/623; 426/630; 426/512; 426/805; 426/658
(58) Field of Classification Search
USPC .......... 426/635, 630, 658, 512, 661, 623, 805
See application file for complete search history.

(56) References Cited

U.S. PATENT DOCUMENTS

| 5,827,565 A | 10/1998 | Axelrod |
| 6,086,940 A | 7/2000 | Axelrod |
| 6,379,725 B1 | 4/2002 | Wang et al. |
| 6,672,252 B2 * | 1/2004 | Levin et al. .................. 119/709 |
| 2003/0168020 A1 | 9/2003 | Levin et al. |
| 2003/0219516 A1 | 11/2003 | Pater et al. |
| 2006/0188611 A1 * | 8/2006 | Unlu et al. ..................... 426/89 |

FOREIGN PATENT DOCUMENTS

| EP | 1354512 A1 | 10/2003 |
| WO | 0145517 A1 | 6/2001 |
| WO | 2004099257 A1 | 11/2004 |
| WO | WO 2005034646 A2 * | 4/2005 |
| WO | 2007101115 A2 | 9/2007 |
| WO | 2007149963 A2 | 12/2007 |
| WO | 2008014000 A1 | 1/2008 |
| WO | 2009142493 A1 | 11/2009 |

OTHER PUBLICATIONS

"Flour descriptions and definitions", downloaded from www.theartisan.net/flour_descriptions_and_definitions.htm, dated Jan. 2001, 4 pages.*
STARCH: Chemistry and Technology, "Wheat Starch: Production, properties, modification and uses", Ed. BeMiller et al., Acad Press. NY, 2009, p. 472.*

* cited by examiner

*Primary Examiner* — Chhaya Sayala
(74) *Attorney, Agent, or Firm* — Hoffmann & Baron, LLP

(57) ABSTRACT

The invention relates to a flexible, non cellular pet chew comprising: a) 51-90 wt % based on the dry solid weight of the mixture of a (thermoplastic) cereal flour, wherein the cereal flour has a protein content below 10 wt. %, b) 5 to 30 wt. %, based on the dry solid weight of the mixture of a plasticizer, and c) 1 to 35 wt. %, based on the dry solid weight of the mixture of a fibrous material.

23 Claims, 1 Drawing Sheet

PET CHEW AND MANUFACTURING PROCESS

This application is the U.S. National Phase of, and Applicants claim priority from, International Application Number PCT/NL2009/050276 filed 20 May 2009 and European Patent Application No. EP 08156556.6 filed 20 May 2008, each of which are incorporated herein by reference.

FIELD OF THE INVENTION

The invention relates to a process for producing a flexible, non cellular pet chew and to a pet chew obtainable by said process.

BACKGROUND OF THE INVENTION

Chewable articles for pets such as dogs are well known in the art. These articles are of a flexible nature and serve as a toy for the pet as well as a means of keeping the pet's dentures in good condition. This type of article can be manufactured of different materials. Mainly, they can be divided in two classes: a non-edible variant and an edible variant.

The non-edible variant of a pet chew can be made from synthetic plastic materials or from raw hide. They have good chewing qualities and, due to their mechanical properties, they have a fairly long lasting time. The greatest disadvantage of most of the non-edible chews is that they are hardly biodegradable and/or digestible, if at all.

Edible pet chews are mostly produced from raw materials such as cereals, rice, milk, slaughterhouse by-products and products derived therefrom such as casein, gelatin, and starches and are by definition biodegradable and may provide nutritious value. Typically, they comprise numerous additives such as gums, meat or other products of animal origin, mineral oils or fats, vitamins, coloring agents, aromas or taste enhancers. The aim is, of course, to produce a coherent product having the desired mechanical properties to last a long time.

Of the known developed compositions for use as an edible pet chew, most are either based on starch, protein, or mixtures thereof.

U.S. Pat. No. 6,379,725 and WO 01/45517 disclose protein-based products, that is, products having a binding matrix essentially consisting of protein.

Starch-based products, that are products having a binding matrix essentially consisting of starch, are also described in the art.

A problem with starch-based compositions is that they readily dissolve in water, which means that during chewing, they become very "mushy" and consequently have a short chew live.

U.S. Pat. No. 5,827,565 discloses a dog chew based on a thermoplastic potato starch, PARAGON IM 1010. This thermoplastic starch comprises a fairly large amount of calcium carbonate. The dog chew has a brittle character and is therefore less suitable for dogs. A disadvantage of most known edible chews is that their mechanical properties are not satisfactory. Due to the fact that they comprise a mixture of several ingredients, they are often brittle and often fall apart soon after a pet, such as a dog, has set its teeth in it.

Starch-based products readily dehydrate if exposed to (dry) air resulting in products that can splinter or shatter and cause danger to the animal. According to US 2003/168020 it is the crystalline nature of the starch polymers that causes this shattering or splintering, and it is proposed that converting the crystalline starch to gelatinized nature solves this problem.

US 2003/168020 discloses starch containing pet chews wherein mixtures comprising wheat flour, rice flour or tapioca flour in combination with a small amount of extra protein are extruded. Very little details are provided about the process or the resulting products.

US 2003/0219516 describes pet chews and methods for their manufacture based on potato starch, wherein a starch-based mixture is extruded to a thermoplastic mass which is subsequently moulded into a desired shape by injection moulding.

Thus, compared to a protein-based product, a starch based product requires specific production steps wherein the starch is gelatinized or destructurized. When combined with specific contents of plasticizers and fibers this will result in a non-cellular, flexible pet chew product which is dimensionally stable.

The present invention aims to provide a pet chew prepared from natural materials of renewable sources, making the chew both edible and biodegradable. It is specifically desired that the chew has excellent mechanical properties giving it a long lasting time, even if used for strong animals such as large dogs.

With respect to mechanical properties and other structural characteristics, it should be noted that WO 01/45517 discloses materials having a tensile strength of 1-5 Mpa (145-725 psi) and that US 2003/168020 discloses materials having tensile strengths ranging from 132 to 1724 psi (1-12 MPa). Thus, the manufacture of pet chews over a range of tensile strengths is in principle available in the prior art. However, there still is a requirement for processes for the production of pet chew products based on thermoplastic starch of high tensile strength.

In addition to a certain tensile strength there is a tendency towards preference for products that are softer, i.e. towards products with a lower E-modulus. It would be preferred if the tensile strength is not too much compromised thereby.

In addition to tensile strength and E-modulus, there is a requirement for esthetic surface characteristics. Detailed surface features and intricate designs of the pet chew will be lost of the texture of the final product is too coarse or if the amount of shrinkage after injection moulding is too large. Therefore, there is a requirement for pet chew products based on thermoplastic starch which have a fine texture, which do not suffer from excessive shrinkage after moulding and wherein detailed surface features and intricate designs are maintained

SUMMARY OF THE INVENTION

The present inventors have found that when a mixture of starch and much protein (such as for instance more than 20%, 30% or even more than 40% such as for instance disclosed in U.S. Pat. No. 6,379,725 and WO 01/45517 is extruded, the protein will be the binding and thermoplastic component in the pet chew. The thermoplastic protein will bind the starch granules together. The starch will not gelatinize under the same conditions, but remain mainly granular as the extrusion process will not affect the granules embedded in the flowing mass. A two-phase mixture will result wherein the starch is not of a thermoplastic nature, but wherein the thermoplastic properties are provided by the thermoplastic protein.

Upon usage of the low protein cereal flour, such as rye flour, the present inventors discovered that an excellent pet chew could be produced from this raw material that did not suffer from the above-referenced problems. The present inventors have discovered that a low protein content such as less than 10%, more preferably less than 8 wt %, based on the weight of the composition does not only result in the complete destructurization of the starch present in the flour, i.e. in the provision of a thermoplastic starch-based product, but that this product also has exceptional structural characteristics, such as surface detail, good appearance, a high tensile strength and a favourably low E-modulus.

Accordingly, the invention relates to a process for preparing a pet chew comprising preparing a mixture of a cereal flour or a derivative thereof, a plasticizer and a fibrous material, wherein the cereal flour has a protein content below 10 wt. %;

converting said mixture into a thermoplastic mass; and moulding the thermoplastic mass into the desired pet chew.

It is preferred that the mixture has a total protein content of below 10 wt. %, more preferably below 9, 8, 7, 6 or even 5 wt. % based on dry solid weight of the mixture.

The amount of cereal flour in the mixture is preferably 51-80 wt. % based on dry solid weight of the mixture.

The product obtained by this process exhibits very low levels of shrinkage after mould. For instance, as explained below in the Examples, a test bar having a mould length of 170 mm shrinks to only 1-4% of its original length. This has the advantage that detailed surface features remain intact after moulding. This is illustrated in the Examples described below.

In a preferred embodiment of a process of the invention, the cereal flour is rye flour.

In aspects of the present invention the plasticizer is suitably chosen from the group of polyols, esters of citric acid and urea. A preferred plasticizer is glycerol. The plasticizer may be present in aspects of the present invention in an amount of from 5 to 30 wt. %, preferably 18 to 30 wt. %, based on the dry solid weight of the mixture or pet chew.

In aspects of the invention, the fibrous material is present in the mixture in an amount of from 1 to 35 wt. %, preferably from 1 to 25, more preferably 5 to 20 wt. %, based on the dry solid weight of the mixture.

The fibrous material preferably consists of fibers having a length between 23 and 2000 µm, more preferably between 60 and 300 µm, an can suitably be is chosen from the group of cellulose, hemp, coconut, grass, flax, potato and other natural fibers.

The mixture may comprise water in an amount of from 7 to 35 wt. %, based on the weight of the mixture.

In aspects of the present invention the flour may be a native flour or a chemically or physically modified flour.

The mixture used in a process of the present invention may further comprise one or more additives chosen from the group of lecithin, monoglycerides, oils, fats, fatty acids or salts thereof (such as calcium stearate), filler materials, vitamins, colouring agents, aromas and taste enhancers.

The mixture is suitably converted into a thermoplastic mass by extrusion at a temperature of from 95 to 180° C., preferably from 100 to 150° C., even more preferably from 120 to 140° C.

The mixture is suitably extruded through a mesh having a pore size of from 1 to 5 mm and cut to produce a granulate material.

The moisture content of the thermoplastic pet chew material (which is the material prior to moulding, usually is the granulate) is preferably conditioned to 5 to 20 wt. %, more preferably from 6 to 15 wt. %, still more preferably from 7 to 10 wt. %, based on the weight of the thermoplastic mass.

The thermoplastic pet chew material is preferably moulded by injection moulding at a temperature ranging from 80 to 200° C., more preferably from 100 to 150° C., still more preferably 110-140° C. and still more preferably from 115-135° C. into a mould of suitable shape and size.

The mixture which is form in a thermoplastic mass in aspects of the invention may be used or function as a matrix material for holding inclusion bodies, which inclusion bodies are added to said mixture before or after conversion of said mixture into a thermoplastic mass. Subsequently, the thermoplastic mass comprising said inclusion bodies is moulded into the desired pet chew.

In another aspect, the present invention provides a pet chew obtainable by a process of the invention as described above.

In another aspect, the present invention provides a pet chew comprising:
a) 51-90 wt %, based on the dry solid weight of the pet chew, of a thermoplastic cereal flour or a derivative thereof, wherein the cereal flour has preferably a protein content below 10 wt. %;
b) a plasticizer, wherein the plasticizer is present in the mixture in an amount of from 5 to 30 wt. %, preferably 18 to 30 wt. %, based on the dry solid weight of the pet chew, and
c) a fibrous material, wherein the fibrous material is present in the pet chew in an amount of from 1 to 35 wt. %, preferably from 1 to 25, more preferably 5 to 20 wt. %, based on the dry solid weight of the pet chew.

In a preferred embodiment of a pet chew of the present invention, the cereal flour is rye flour.

In yet another preferred embodiment of a pet chew of the present invention, the pet chew product has an E-modulus in the range of 30 to 100 MPa in combination with a tensile strength in the range of 3-6 MPa.

DETAILED DESCRIPTION OF THE INVENTION

Figure 1A:
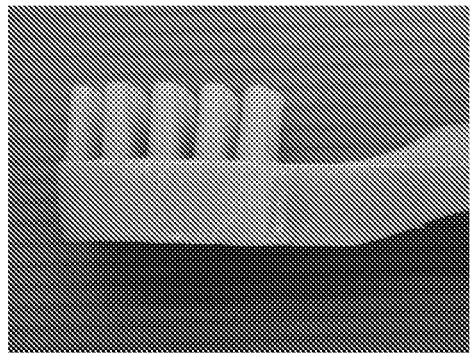
FIG. 1 shows a detailed view of the surface of a pet chew product produced from pure wheat starch as a reference. This surface texture/appearance is taken as the reference. A and B are different parts of the same pet chew product. This product is referred to as "reference" in Table 1 of Example 1.
Figure 1B:
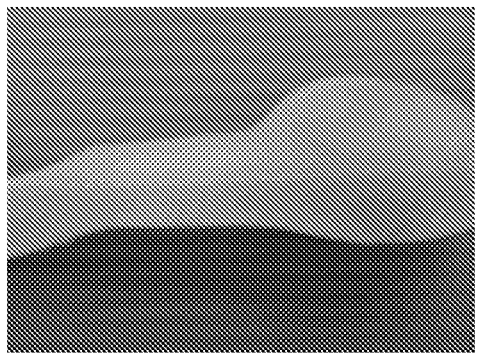
Figure 2A:
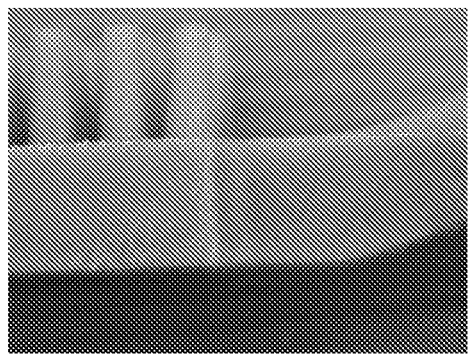
FIG. 2 shows a detailed view of the surface of a pet chew product produced from rye flour in accordance with the present invention. This surface texture/appearance is very good. A and B are different parts of the same pet chew product.
Figure 2B:
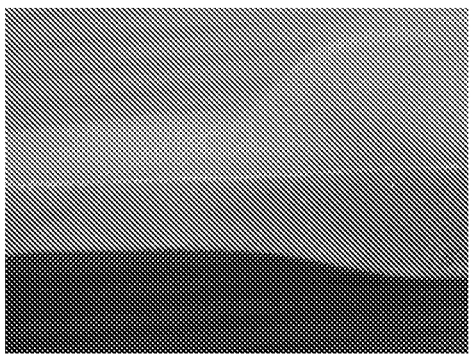

Due to the nature of the raw material on which a pet chew according to the invention is based, cereal flour having a protein content of below 10.0 wt. %, it is a biodegradable, 100% renewable, edible product to which no risks associated with for instance BSE or Salmonella are associated, because it is preferably based on 100% vegetable raw materials.

Furthermore, the specific composition of starting materials and the method of producing the chew makes that it has excellent mechanical properties. It is both tough and flexible, and has a long lasting time. It is a product which, in its mechanical properties, closely resembles known chews based on synthetic materials, while it is nevertheless edible and biodegradable. Due to its advantageous mechanical properties, a chew according to the invention has a beneficial effect on the dentures of a pet. It is a particular advantage of the product of the present invention that the product exhibits very low deformation or shrinkage during injection moulded curing.

In the present invention the flour is a cereal flour having a protein content of below 10.0 wt. %, preferably obtained from rye flour. The cereal flour may be processed such as to enrich the starch fraction therein. For instance, the starch and gluten contained in an aqueous flour slurry may be separated by methods known in the art, such as by ethanol treatment, but typically, the raw flour is used in aspects of the present invention.

The cereal flour having a total protein content of below 10.0 wt. %, in aspects of the present invention is preferably rye flour.

The term "flour" as used herein refers to the powder resulting from grinding cereal grains. The use of cereal flour having a protein content of below 10.0 wt. %, as the starch component was found to lead to a final product have a very good E-modulus. The flour may be a fine ground and optionally sieved powder (conventionally termed flour) or a more coarsely ground and less sieved powder (conventionally termed meal).

The cereal flour can be used in native form, but may also be physically or chemically modified. Of course, it is also possible to use combinations of native flour and modified flour, or combinations of different modified flours. Chemically modified flours which may be used are oxidized flours, carboxymethylated flours, hydroxyalkylated flours, acetylated flours, (partially) hydrolysed flours, and other derivatized flours. An example of a suitable physically modified flour is a flour which has been subjected to ion exchange with, for instance, sodium or potassium ions.

The mixture that is to be converted into a thermoplastic pet chew material according to the invention preferably comprises an amount of cereal flour from 50 to 90 wt. %, preferably from 51 to 80 wt. %, most preferably from 52, 53, 54, 55, 56, 57, 58, 59, 60, 61, 62, 63, 64, 65, 66, or 67 wt. % to 72, 73, 74, 75, 76, 77, 78, 79 or 80 wt. % based on dry solid weight of the mixture.

The end product (moulded pet chew) preferably comprises an amount of cereal flour from 50 to 90 wt. %, preferably from 51 to 80 wt. %, most preferably from 52, 53, 54, 55, 56, 57, 58, 59, 60, 61, 62, 63, 64, 65, 66, or 67 wt. % to 72, 73, 74, 75, 76, 77, 78, 79 or 80 wt. % based on dry solid weight of the mixture. Part (for instance up to 50%) of the flour raw material can be replaced by native of chemically/physically modified starch.

A preferred example of a modified cereal flour is a cereal flour hydrolysate. This is a native (or already otherwise modified) flour which has been subjected to a partial chemical or enzymatic hydrolysis. The starch in this flour is modified due to this treatment. The extent of hydrolysis can be expressed in terms of the dextrose equivalent (DE). Starch which has not been subjected to hydrolysis has a DE of 0, whereas a completely hydrolysed starch has a DE of 100. In order to improve the flowing characteristics of a mixture from which a thermoplastic starch is prepared according to the invention, it is preferred to incorporate a starch hydrolysate having a DE up to 40, more preferably between 1 and 20. It has been found that the use of a partially modified flour in the preparation of a pet chew according to the invention results in a product having superior characteristics. The mobility or viscosity of the mixture to be converted into a thermoplastic starch is increased, leading to an improved relaxation of the stress present in the material. As a result an increased dimensional stability in conjunction with an improved flexibility are achieved.

If desired, the flour may be mixed with other natural and biodegradable polymers such as cellulose and derivatives thereof, proteins such as zein or wheat proteins, or other polysaccharides such as gums (Arabic gum, guar gum and the like), pectin, or dragant.

In order to prepare a pet chew of a flour material according to the invention, the flour is first converted into a thermoplastic mass. To that end, a mixture of the flour with suitable additives is prepared, which mixture is then subjected to extrusion.

Suitable cereal flour for use in the present invention have a protein content of below 10.0 wt. %. More preferably the protein content in a cereal flour used in aspects of the invention is below 9.5, 9.0, 8.5, 8.4, 8.3, 8.2, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, or 4.0 wt %. The major protein in the cereal flour is gluten. Hence the protein content in the cereal flour may suitably be determined by measuring the gluten content of the flour. Other methods of measuring the protein content of the cereal flower are for instance the generally accepted Kjeldahl method.

Total protein content of the mixture should be below 20%, preferable below 10%, more preferably the total protein content of the mixture to be extruded is below 7.0 wt. % based on dry solid weight of the mixture, even more preferably 0.001-6 wt %.

An important aspect of the invention is that the flour is mixed with a plasticizer. Although water also has plasticizing qualities in a process of producing a pet chew according to the invention, an additional plasticizer is required. A preferred class of plasticizers is the class of polyols. This class comprises, amongst others, glycol, diethylene glycol, alkylene glycols, polyalkylene glycol, sorbitol, glycerol, glycerol mono-esters, and the like. Other suitable classes of plasticizers include esters of citric acid, and urea.

The amount of water that is preferably present in the starting mixture to prepare a pet chew according to the invention from is from 7 to 35 wt. %, based on dry solid weight of the mixture. In addition to that, 5 to 30 wt. %, preferably 15 to 30 wt. %, and more preferably 18 to 30 wt. %, based on dry solid weight of the mixture, of the additional plasticizer is used. It has been found that these amounts of plasticizer lead to a very flexible product, while the dimensional stability of the final product, the pet chew, is not endangered when combined with fibre.

The mixture may further comprise other additives such as an emulsifier. Suitable examples of emulsifiers include lecithin and monoglycerides. An emulsifier will be preferably be present in an amount of from 0 to 5 wt. %, based on dry solid weight of the mixture. Flow property enhancers/lubricants result in an increased processability (products with lower stress) of the thermoplastic mass. Examples of flow property enhancers are vegetable oils and fats, especially hydrogenated oils and fats, and fatty acids and fatty acid derivatives such as mono- and diglycerides, fatty acid amides, metal salts and sorbitanesters of these fatty acids. Also fosfatides can be used as flow property enhancer. Ricinus oil and lecithin are examples of flow property enhancers/lubricants with a particular good performance. The amount of flow property enhancer in the mixture to be converted to a thermoplastic mass can be up to 10%, more preferably between 0 and 5 wt. % based on dry solid weight.

Another important ingredient in the mixture is a fiber. Preferably, a pet food-grade fibrous material of natural origin is used. Preferred examples include cellulose, hemp, coconut, grass, flax, potato and other natural fibers. The fibers preferably have a length between 23 and 2000 μm, more preferably between 60 and 300 μm. The amount in which the fiber is preferably used is chosen in the range of from 1 to 35 wt. %, more preferably from 1 to 25 wt. %, and even more preferably 5 to 20 wt. %, based on the weight of dry solid mixture.

It is further possible to incorporate a filler material into thermoplastic mass, such as an organic filler material, or inorganic filler material, such as chalk or titanium oxide. A filler is preferably added in an amount of from 0 to 10 wt. %, based on the weight of dry solid mixture. Other additives, such as health ingredients, coloring agents, enzymes, aromas or palatability enhancers can also be incorporated at this stage. For example, as pH regulator sodium bicarbonate or a phosphate buffer can be used. As health ingredients, vitamins or conjugated linoleic acid (CLA) can be used. As aroma or palatability enhancer, chicken, beef, or vegetable (e.g. mint or vanilla) aromas are often employed. As coloring agents, red, yellow, orange (iron oxide), green (chlorophyll) or white (titanium oxide) colorants are often employed. Typically, these additives will be added in an amount in the range of from 0 to 10 wt. %, based on dry solid weight of the mixture.

The inclusion body can any coarsely milled natural substances, preferably in particulate form, such as rice grains or wheat bran. The size of the particulate may be 0.1-5 mm.

The thermoplastic mass or pet chew material may take the form of a matrix material wherein particles are embedded, such particles are for instance rice grains or marbles or other materials which become randomly dispersed throughout the final pet chew product. Such embedded materials are not part of the thermoplastic mixture with reference to the amounts of ingredients of that mixture as described herein. Thus, the amount of embedded materials may for instance be 5%, 10%, 20%, 30%, 40%, 50% or even more, such as up to 60%, 70% or 80% wt %, based on the weight of the pet chew product. The embedded materials may suitably be added before extrusion of the mixture, to the thermoplastic mass during or after extrusion, or to the thermoplastic pet chew material (granulate) just prior to moulding.

A very beneficial ingredient in the mixture is a pH regulator. This can be added as buffer solution such as phosphate buffer or as one component acid solution. By the use of acid in the mixture a further reduction in the E-modulus may be obtained, which gives a much softer product. Suitable acids include food-grade acids, preferably an organic carboxylic acid. The mixture preferably comprises from about 0.01 to about 10% and most preferably about 0.1% to about 4% by weight of the acid. Suitable acids include citric, tartaric, fumaric, malic, lactic and other like acids, with citric acid being preferred. The acid will influence the pH of the granulate after extrusion. The pH of the granulate is preferably between 2 and 6.5.

In order to prepare a thermoplastic mass of the above-described mixture, it is subjected to an extrusion step. During the extrusion, the starchy part of the flour will be gelatinised. It is preferred to use a twin-type extruder operated at a temperature of from 95 to 180° C., more preferably from 100 to 150° C., even more preferably from 120-140° C. As the mixture will undergo a thorough homogenisation during extrusion, it is not of crucial importance that all ingredients of the mixture are mixed so rigorously as to obtain a homogeneous mixture prior to extrusion.

During the extrusion, the starch part of the flour will be converted from a ordered structure into an unordered, amorphous structure (destructurizing), which yields a thermoplastic, very well processable material.

In one embodiment, the pet chew is moulded in an extrusion step. In principle, it is possible that this is done in the same extrusion step as described above for obtaining the thermoplastic mass. However, it is preferred that a second extrusion step is performed. In that case, the second extrusion step is preferably carried out using a single-screw type extruder. Between the first and second extrusion step, the thermoplastic material may be pressed through a mesh having a pore size of from 1 to 5 mm and cut to obtain a granulate material. This granulate material is preferably conditioned to an appropriate moisture content for the second extrusion step, which moisture content will generally be lower than that during the first extrusion step.

During extrusion, the starchy part of the flour is essentially destructurized completely, that is, preferably more than 70%, 80%, 90%, 95%, 96%, 97%, 98%, 99% of the starch fraction in the extruded product is destructurized. In comparison, prior art products comprising protein in addition to starch comprise destructurized starch fractions of no more than 30-70% in the extruded product. In these prior art products, it is the thermoplastic protein, not the starch, that functions as the bonding compound or adhesive ingredient.

It is one of the advantages of the invention that the thermoplastic material that is formed in the extruder is sufficiently plastic in character to be pressed through a die. The material that exits the extruder is either cut directly at the die opening to the desired size and shape, or is first cooled using forced air or nitrogen cooling and then cut to the desired size and shape. It is preferred that the material is not water-cooled. In another embodiment, the pet chew is moulded by injection moulding. In accordance with this embodiment, it is preferred that the destructurized flour mixture is pressed through a mesh having a pore size of from 1 to 5 mm after extrusion, or preferably as a last step of the extrusion process. This will typically be done if the pet chew is to be moulded by injection moulding.

The obtained fibrous material is preferably cut to obtain a granulate material. This granulate material is preferably conditioned to a moisture content of from 5 to 20 wt. %, more preferably from 6 to 15 wt. %, even more preferably from 7 to 10 wt. %, based on the weight of the granulate material. The moisture content can be controlled by using a vacuum zone in the extruder or by drying the granulate with hot air.

During injection moulding, it is preferred to employ a processing temperature ranging from 80 to 200° C., more preferably from 100 to 150° C., still more preferably 110-140° C., still more preferably from 115-135° C.

If no, or not all additives like vitamins, colouring agents, aromas or taste enhancers have been added prior to extrusion, they can also be added to the thermoplastic flour granulate directly prior to (injection) moulding. Materials to be embedded into the product matrix, such as rice grains, can be added before extrusion or to the thermoplastic flour granulate directly prior to (injection) moulding. The injection moulding is preferably performed using a pressure in the barrel of the apparatus of below 1500 bar. The rate of injection is preferably kept relatively low and the injection channels are preferably relatively wide in order to keep the shear, that the material is exposed to, low.

Modification of the injection moulding process may lead to an improved dimensional stability of the ultimate product. In order to achieve this, the process should be designed in such a way that the lowest amount of stresses is frozen in the matrix. This can be realised by increasing the processing temperature, low backpressure profiles and high mould temperatures, in combination with a low injection speed. As a result cycle times will increase. Therefore the use of a carrousel machine may be beneficial.

The mould into which the granulate material is injection moulded, or the shape into which the material is cut after extrusion, preferably has the shape of a dog chew, such as the form of a bar, or a hollow or other natural shape, for instance mimicking the shape of a bone. Other shapes that are contemplated are of a marrow bone, pig's ear, tooth brush, or a combination of shapes such as a dog chew which is shaped like a bone on one side and like a tooth brush on the other.

The final pet chew product of the present invention is preferably soft with an E-modulus in the range of 30 to 100 MPa, more preferably 30 to 80 MPa, even more preferably 30 to 40, 45, 50, 55, or 60 MPa.

Preferably, the final pet chew product of the present invention has a tensile strength in the range of 3-6 MPa, such as 3.5, 4.0, 4.5, 5.0 or 5.5 MPa.

The final product is preferably packaged in a waterproof, moisture proof and usually air proof packaging material.

It is to be noted that it is contemplated that the above described two embodiments of extrusion and injection moulding can be combined, for instance by making use of a twin-screw extruder mounted on an injection moulding device. In accordance with such a combined embodiment, the extruded product is introduced into the injection moulding chamber without intermediate production of granulate material.

The invention will now be further elucidated by the following, nonrestrictive examples.

EXAMPLES

Example 1

113 parts by weight of food grade rye flour ("Rijn"-type; moisture content 11.6%, obtained from Meneba, Rotterdam, The Netherlands) (or for comparative experiments Emerald wheat flour, also obtained from Meneba), 33.6 parts glycerol (type 1.26 glycerol vegetable, obtained from Vivochem, Almelo, The Netherlands), 6.1 parts by weight of lecithin (ADLEC DNGM obtained from Brenntag Nederland) and 27.0 parts by weight of cellulose fiber (type Arbocell BWW 40; average length of the fibre 200 μm; obtained from Rettenmaier Benelux) were mixed together.

The mixture was extruded in a Buhler Twin Screw extruder DNDF-93 (L/D=24) extruder. The temperature profile was: 18 (feeding zone)/104/130/95/90/90 (die)° C. The extrudate was granulated (pellet dimensions were about 4 mm) and dried to a moisture content of 9-10%.

The granulate was injection moulded using an injection moulding apparatus Demag D60 NCIII-K, equipped with a standard PE-screw. Processing temperature was 125-130° C.; the mould temperature was 20° C.

Sample bars were moulded according to DIN 23167. The sample bars were conditioned for 7 days at 20 C and 50% relative humidity. For determination of mechanical properties, a Zwick 1445 tensile tester with strain transducers was used. The shrinkage properties in the injection moulding direction were determined by comparing the length of the bars before and after conditioning.

An overview of the experiments and the results is presented in Table 1. When compared with usage of wheat starch, usage of cereal flour having a protein content of below 10.0 wt. % in the form of rye flour results in a decrease in E-modulus without significantly compromising the tensile strength of the product. Moreover usage of rye flour results in a decrease of shrinkage values.

Figure 3A:
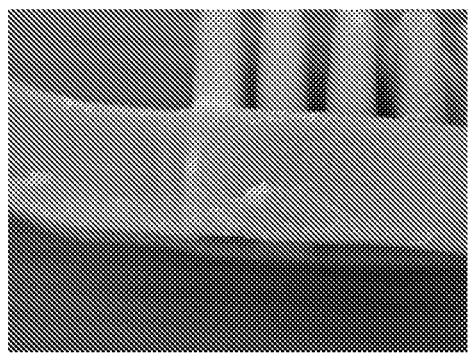
FIG. 3 shows a detailed view of the surface of a pet chew product produced from wheat flour. The surface texture/appearance of this product is unacceptable and shows cracks and traces of material flow. A and B are different parts of the same pet chew product. See Example 1 for more details.
Figure 3B:
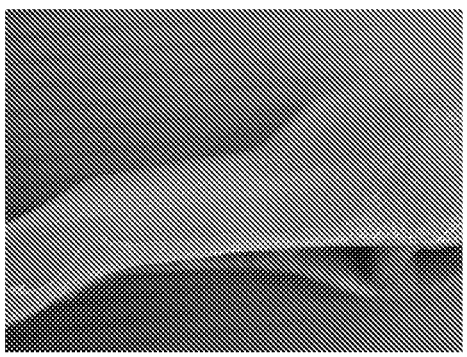

Usage of the wheat flour resulted in undesirable surface features as indicated in FIG. 3.

TABLE 1

Compilation of results of tests as described in Example 1

| Code | Formulation[1] | Length (mm)[2] | E-Modulus (MPa) | Tensile Strength (MPa) | Elongation at break (%) | pH of granulate |
|---|---|---|---|---|---|---|
| Reference | | | | | | |
| Ref dry | 116WN-33.6G-6.1L-27.0BWW40-4.6taste-27.6X$_w$ (9.5%) | 162.5 [0.0] | 134.1 [5.9] | 6.9 [0.2] | 34.4 [1.0] | 5.61 |
| Rye flour based | | | | | | |
| 2008 VII | 113Rye flour-33.6G-6.1L-27.0BWW40-4.6taste-26X$_w$ (9.6%) | 164.7 [0.3] | 76.2 [3.6] | 5.4 [0.1] | 27.4 [1.6] | 6.15 |
| 2008 VIII | 113Rye flour-33.6G-6.1L-27.0BWW40-4.6taste-26X$_w$-2.7TiO2 (9.5%) | 164.9 [0.2] | 87.1 [4.4] | 5.5 [0.1] | 28.4 [1.1] | 6.28 |

TABLE 1-continued

Compilation of results of tests as described in Example 1

| Code | Formulation[1] | Length (mm)[2] | E-Modulus (MPa) | Tensile Strength (MPa) | Elongation at break (%) | pH of granulate |
|---|---|---|---|---|---|---|
| 2008 VI | 113Rye flour-33.6G-6.1L-27.0BWW40-4.6taste-27.6$X_w$-5.31citric acid (9.6%) | 167.3 [0.3] | 36.1 [0.8] | 3.1 [0.0] | 28.0 [1.2] | 3.18 |

[1]The formulation can be read as follows:
starch: WN: wheat starch
plasticizer: G: glycero
emulsifier: L: lecithin
fiber: BWW40: Arbocel BWW40 200 μm fiber.
Standard deviation of the measurements is given in brackets
[2]Sample bars were produced as described in the Example at a length of 170.0 mm before conditioning. The final length of the sample bar after conditioning was measured and the shrinkage properties in the injection moulding direction were determined by comparing the length of the bars before and after conditioning as described above.

The invention claimed is:

1. A process for preparing a non cellular pet chew comprising
preparing a mixture of:
51-90 wt % based on the dry solid weight of the mixture of a cereal flour having a protein content below 10 wt. %;
5-30 wt. % based on dry solid weight of the mixture of a plasticizer; and
1 to 35 wt. % based on the dry solid weight of the mixture of a fibrous material consisting of fibers having a length of between 23 and 2000 μm;
converting said mixture into a thermoplastic mass whereby the starch present in the flour is destructurized; and
moulding the thermoplastic mass into the desired pet chew.

2. A process according to claim 1, wherein the cereal flour is rye flour.

3. A process according to claim 1, wherein the cereal flour is a native cereal flour or a chemically or physically modified cereal flour.

4. A process according to claim 1, wherein the plasticizer is selected from the group of polyols, esters of citric acid and urea.

5. A process according to claim 4, wherein the plasticizer is glycerol.

6. A process according to claim 1, wherein the plasticizer is other than water and is present in the mixture in an amount of from 18 to 30 wt. % based on the dry solid weight of the mixture.

7. A process according to claim 1, wherein the fibrous material is selected from the group of cellulose, hennep, coconut, grass, flax, potato and other natural fibers.

8. A process according to claim 1, wherein the fibrous material is present in the mixture in an amount of from 1 to 25%, based on the dry solid weight of the mixture.

9. A process according to claim 1, wherein the fibrous material consists of fibers having a length between 60 and 300 μm.

10. A process according to claim 1, wherein the mixture comprises water in an amount of from 7 to 35 wt. %, based on the weight of the mixture.

11. A process according to claim 1, wherein the cereal flour is a cereal flour hydrolysate.

12. A process according to claim 1, wherein the mixture further comprises one or more additives selected from the group of lecithin, monoglycerides, oils, fats, fatty acids, salts of fatty acids, filler materials, vitamins, colouring agents, aromas and taste enhancers.

13. A process according to claim 1, wherein the mixture is converted into a thermoplastic mass by extrusion at a temperature of from 95 to 180° C.

14. A process according to claim 13, wherein the mixture is extruded through a mesh having a pore size of from 1 to 5 mm and cut to produce a granulate material.

15. A process according to claim 1 wherein the moisture content of the thermoplastic mass is conditioned to 5 to 20 wt. %, based on the weight of the thermoplastic mass.

16. A process according to claim 1, wherein the thermoplastic mass is moulded by injection moulding at a temperature ranging from 80 to 200° C. into a mould of a dog chew.

17. A process according to claim 1, wherein said mixture is used as a matrix material for holding inclusion bodies, which inclusion bodies are added to said mixture before or after conversion of said mixture into a thermoplastic mass, and wherein said thermoplastic mass comprising said inclusion bodies is moulded into the desired pet chew.

18. A pet chew obtained by a process according to claim 1.

19. A pet chew comprising a moulded thermoplastic mass comprising:
a) 51-80 wt % of a cereal flour, wherein the cereal flour has a protein content below 10 wt. %;
b) a plasticizer, wherein the plasticizer is present in the mixture in an amount of from 5 to 30 wt. %, based on the dry solid weight of the pet chew, and
c) a fibrous material, wherein the fibrous material is present in the pet chew in an amount of from 1 to 35 wt. %, based on the dry solid weight of the pet chew.

20. A pet chew according to claim 19, wherein the cereal flour is rye flour.

21. A pet chew according to claim 19 having an E-modulus in the range of 30 to 100 MPa in combination with a tensile strength in the range of 3-6 MPa.

22. A pet chew according to claim 19 further comprising inclusion bodies included in said moulded thermoplastic mass.

23. A pet chew according to claim 19 moulded in the form of a bone, tooth brush, animal, pig's ear, bar, hollow, marrow bone or a natural shape.

* * * * *